US007548998B2

(12) United States Patent
Carlson et al.

(10) Patent No.: US 7,548,998 B2
(45) Date of Patent: Jun. 16, 2009

(54) MODIFYING HOST INPUT/OUTPUT (I/O) ACTIVITY TO ALLOW A STORAGE DRIVE TO WHICH I/O ACTIVITY IS DIRECTED TO ACCESS REQUESTED INFORMATION

(75) Inventors: Wayne Charles Carlson, Tucson, AZ (US); Erika Marianna Dawson, Tucson, AZ (US); Gavin Stuart Johnson, San Jose, CA (US); Joel Kenneth Lyman, Tucson, AZ (US); Harry Morris Yudenfriend, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 11/553,964

(22) Filed: Oct. 27, 2006

(65) Prior Publication Data
US 2008/0147892 A1 Jun. 19, 2008

(51) Int. Cl.
G06F 3/00 (2006.01)
G06F 13/00 (2006.01)
G06F 7/04 (2006.01)

(52) U.S. Cl. .............................. 710/58; 710/5; 710/59; 711/100; 726/2

(58) Field of Classification Search .................. None
See application file for complete search history.

(56) References Cited

U.S. PATENT DOCUMENTS

| 5,555,414 | A | 9/1996 | Hough et al. |
| 5,963,646 | A | 10/1999 | Fielder et al. |
| 6,185,639 | B1 | 2/2001 | Kailash et al. |
| 6,823,355 | B1 | 11/2004 | Novaes et al. |
| 7,028,078 | B1 | 4/2006 | Sharma et al. |
| 7,096,300 | B2 | 8/2006 | Siversten |
| 7,103,692 | B2 | 9/2006 | Kwatra et al. |
| 2003/0037247 | A1 | 2/2003 | Obara et al. |
| 2005/0027907 | A1* | 2/2005 | Lee et al. ................ 710/58 |
| 2005/0081099 | A1 | 4/2005 | Chang et al. |
| 2005/0157752 | A1 | 7/2005 | Takase et al. |

(Continued)

FOREIGN PATENT DOCUMENTS

WO 03088565 A1 10/2003

OTHER PUBLICATIONS

U.S. Patent Application entitled "Communicating Packets Between Devices Involving the Use of Different Communication Protocol", Serial No. unknown, filed Oct. 27, 2006, by inventors W.C. Carlson, E.M. Dawson, G.S. Johnson, T.T. LE, M.H. Sabins, P.G. Sutton and H.M. Yudenfriend.

(Continued)

*Primary Examiner*—Alan Chen
(74) *Attorney, Agent, or Firm*—David W. Victor; Konrad Raynes & Victor LLP

(57) ABSTRACT

Provided are a method, system, and article of manufacture to process communications between a host and storage drive having a storage media. An Input/Output (I/O) request is received from the host directed to the storage media that requires requested information be sent to the storage drive to use to execute the I/O request against the storage media. A message is sent to the host to cause the host to modify I/O timeout operations in response to determining that the requested information is required.

40 Claims, 9 Drawing Sheets

U.S. PATENT DOCUMENTS

2005/0228961 A1 10/2005 Reuter et al.
2005/0246477 A1 11/2005 Adams et al.
2005/0257274 A1 11/2005 Shiga et al.
2006/0020935 A1 1/2006 Tran et al.
2006/0106979 A1 5/2006 Toshine
2006/0136570 A1 6/2006 Pandya
2007/0250623 A1* 10/2007 Hickey et al. ............... 709/224

OTHER PUBLICATIONS

Document dated Feb. 27, 2009 citing art from China Patent Office fo IBM Docket No. TUC920060182CN1.

* cited by examiner

MODIFYING HOST INPUT/OUTPUT (I/O) ACTIVITY TO ALLOW A STORAGE DRIVE TO WHICH I/O ACTIVITY IS DIRECTED TO ACCESS REQUESTED INFORMATION

BACKGROUND OF THE INVENTION

1. Field of the Invention

The present invention relates to a method, system, and article of manufacture for modifying host Input/Output (I/O) activity to allow a storage drive to which i/o activity is directed to access requested information.

2. Description of the Related Art

Data stored in removable media cartridges may be encrypted by an encryption engine to protect the data. Data encryption is especially useful for businesses that store personal data on their customers. Recent government regulations place requirements and legal obligations on companies storing personal data to report missing data or prevent the data from being stolen.

In prior art systems, a host may submit I/O requests to a storage drive via a control unit, such as a tape control unit, which provides an interface between hosts and multiple storage drives, e.g., tape drives. If the tape control unit receives an I/O request from the host and determines that the tape drive is busy performing operations unrelated to I/O processing, such as error recovery, then the control unit may return a notification to the host to cause the host to suspend timeout operations. In certain prior art systems, the control unit includes a timer. If the control unit timer expires while an I/O request is pending to a tape drive, then the tape control unit determines whether the tape drive is busy with processing unrelated to executing I/O operations. If so, then the control unit sends a message, such as a quiesce message, to the host to cause the host to suspend timeout operations to prevent the host from prematurely terminating the job.

SUMMARY

Provided are a method, system, and article of manufacture to process communications between a host and storage drive having a storage media. An Input/Output (I/O) request is received from the host directed to the storage media that requires requested information be sent to the storage drive to use to execute the I/O request against the storage media. A message is sent to the host to cause the host to modify I/O timeout operations in response to determining that the requested information is required.

In a further embodiment, the message comprises a first message. A second message is sent to the host to cause the host to resend the I/O request in response to the storage drive receiving the requested information.

In a further embodiment, the first message comprises a quiesce message that causes the host to suspend an I/O request job stream and suspend any timeout operation with respect to the I/O request. The second message causes the host to restart timeout operations and resend the I/O request.

In a further embodiment, determining that the information is needed comprises receiving a request for the information from the storage drive.

In a further embodiment, the message indicates an information access method indicating that the requested information is transferred between the storage drive and a device via the host facilitating the exchange of the requested information over a first network over which the I/O request was communicated or via a second network.

In a further embodiment, the host indication of the information access method is received for a plurality of storage drives. The first network and the second network are capable of being indicated as the information access method for different storage drives.

In a further embodiment, the message indicates that the information access method uses the second network. A request for the requested information is sent to the device over the second network. The information key is received from the device and the received information is sent to the storage drive via a third connection.

In a further embodiment, the message indicates that the information access method uses the first network and wherein the message causes the host to facilitate the exchange of the requested information between the device and the storage drive via the first network.

In a further embodiment, a quiesce message is returned in response to receiving a subsequent I/O request from the host to the storage drive. Processing of host commands that do not require interaction with the storage drive and that terminate the transfer of the requested information to the storage drive is permitted.

In a further embodiment, the requested information comprises an encryption key the storage drive needs to process the host I/O request.

Further provided are a method, system, and program to process communications between a control unit and storage drive having a storage media. An I/O request is sent to a control unit that is directed to a storage media accessed by a storage drive, wherein the control unit is in communication with the storage drive. A message is received from the control unit in response to the storage drive requesting information to process the I/O request. Timeout operations with respect to the I/O request are modified in response to the message. The I/O request is resent in response to the storage drive receiving the requested information.

In a further embodiment, the message indicates whether the requested information will be obtained from a device via a first network through which the I/O request was communicated to the control unit or a second network.

In a further embodiment, the message indicates that the requested information is obtained via the first network, and wherein modifying timeout operations comprises suspending an I/O request job stream including the sent I/O request. A request is sent to the device for the requested information. The requested information is sent from the device to the control unit to forward to the storage drive in response to obtaining the requested information. The I/O request is resent in response to the storage drive receiving the requested information.

In a further embodiment, the message comprises a first message. A second message is received from the control unit in response to the storage drive receiving the requested information, wherein the I/O request is resent and the I/O job stream suspension ended in response to receiving the second message.

In a further embodiment, the message indicates that the requested information is obtained via the second network and the message comprises a first message. A second message is received from the control unit in response to the storage drive receiving the requested information, wherein the I/O request is resent in response to receiving the second message.

In a further embodiment, the requested information comprises an encryption key the storage drive needs to process the I/O request.

DETAILED DESCRIPTION

Figure 1:
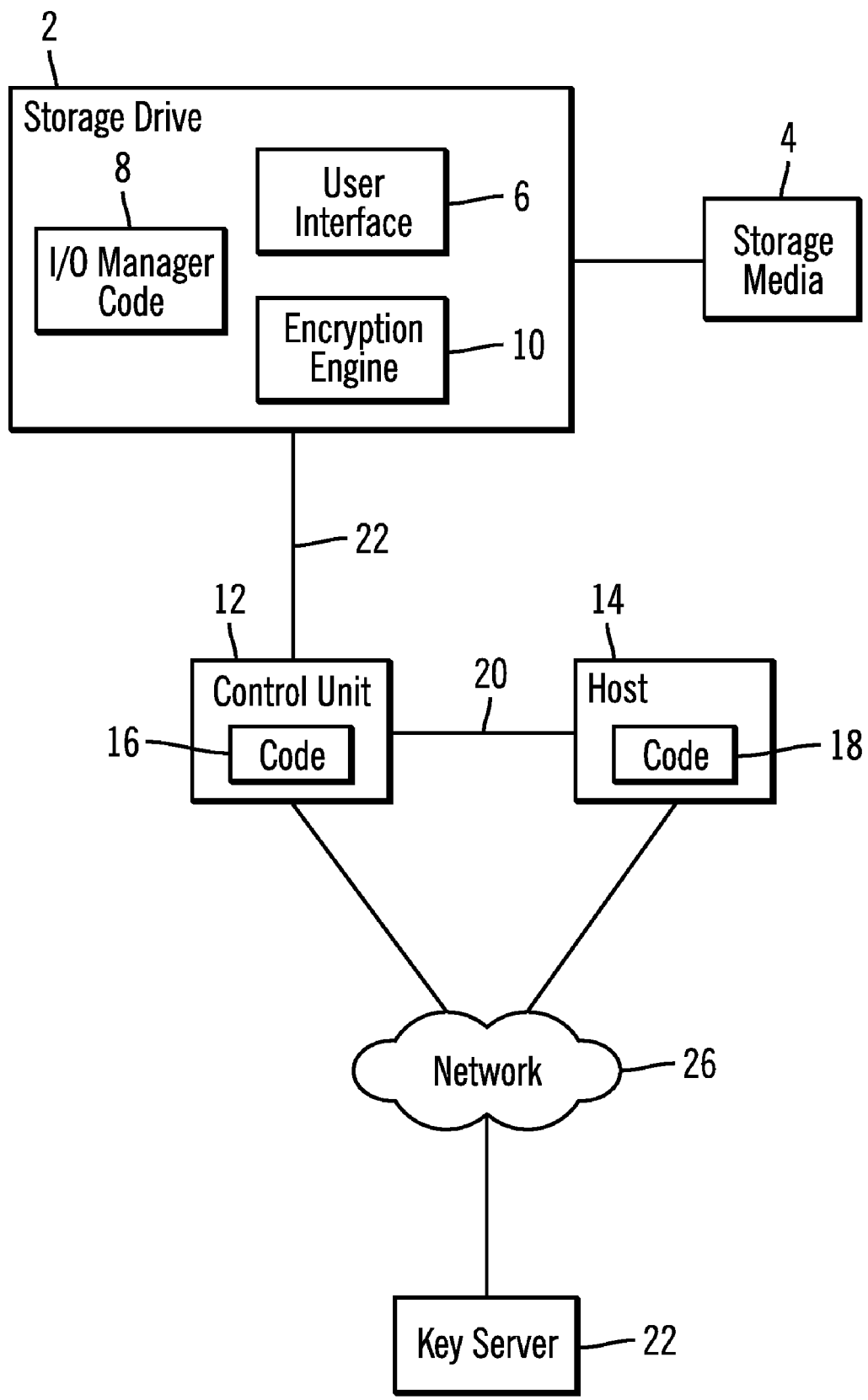
FIG. 1 illustrates an embodiment of a storage computing environment.

FIG. 1 illustrates an embodiment of a storage computing environment including a storage drive 2, which may comprise a removable storage drive, for interfacing with a storage media 4, which may comprise a removable storage media that is mounted in the storage drive 2. The storage drive 2 may include a user interface 6 comprising one or more buttons or keys for interacting with the storage drive 2. The user interface 6 may include an eject button for manually unloading removable media; up/down buttons for navigating a list of items, enter/exit buttons for selecting items or exiting from a menu or list; one or more status displays, such as a light or LED (Light Emitting Diode), a numeric display, and alphanumeric display, etc. Additionally, a user interface may be presented to the storage device 2 on a connected computer system. The storage media 4 may be mounted in the storage drive 2.

The storage drive 2 includes Input/Output (I/O) manager code 8 to perform read/write operations with respect to the coupled storage media 4 and an encryption engine 10. The storage media 4 may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, CompactFlash™, Smartmedia™, Memory Stick™, etc.), or other suitable media. In certain embodiments, the storage media comprises a removable storage media having a cartridge housing, such as the case with a magnetic tape cartridge or removable disk drive, The encryption engine 10 may use one or more encryption algorithms to encrypt and decrypt data with respect to the coupled removable storage media 4, which include, but are not limited to, DES (Data Encryption Standard), AES (Advanced Encryption Standard), RSA (Rivest Shamir Adleman), and other suitable encryption algorithms known in the art.

A storage control unit 12 manages host 14 access to one or more storage drives 2, such that hosts communicate I/O requests for storage media 4 coupled to one storage drive 2 to the storage control unit 12. The control unit 12 and host 14 include code 16 and 18, respectively, to perform control unit 12 and host 14 operations, respectively.

The code 8, 16, and 18 may be implemented as hardware logic in a hardware device or implemented in a computer readable medium. In embodiments where the code 8, 16, and 18 is implemented in a computer readable medium, a processor in the storage drive 2, control unit 12 and host 14 would access the corresponding code 8, 16, and 18, respectively, from the computer readable medium in which it is stored and execute the accessed code.

The control unit 12 and hosts 14 may communicate via a connection 20 over which the host 14 communicates I/O requests to the control unit 12 to access storage media 4. The connection 20 may utilize a host driven command-response protocol. The control unit 12 and one or more storage drives 2 may communicate over a connection 22 that may be separate from the connection between the control unit 12 and hosts 14. In one embodiment, the connections 20 and 22 may use different or the same host driven command-response protocol, e.g., connection 20 may use a Fibre Connectivity (FICON) interface and protocol and the connection 22 may use a Fibre Channel Protocol (FCP) interface. In an alternative embodiment, the connections 20 and 22 may be part of the same network and use the same connection protocol. The connections 20 and 22 may be part of a same or different storage related network(s), such as a Storage Area Network (SAN).

In one embodiment, the control unit 12 and storage drives 2 to which the control unit 12 interfaces may be included in separate enclosures or housings, where the control unit 12 may communicate with the coupled storage drives over the network 20. In one embodiment, the control unit 12 may have separate connections to each of the storage drives 2 or connected to the storage drives in a loop topology, such as a Fibre Channel arbitrated loop, etc. The control unit 12 and the coupled storage drives may be included in a same device housing, such as an automated storage library or other storage enclosure.

The control unit 12 and host 14 may connect to a key server 24 over a network 26, which may utilize a different interface and protocol from the connections 20 and 22, such as the Transmission Control Protocol/Internet Protocol (TCP/IP). Additionally, the control unit 12 and host 14 may connect to multiple key servers 24 providing redundancy. Thus, the network 26 may comprises a Local Area Network (LAN), Wide Area Network (WAN), the Internet, an Intranet, etc. The network 26 may comprise a same network shared by the control unit 12 and host 14 to access the key server 24 or may comprise separate networks. Further, the host 14 may be coupled to a separate key server than the key server 24 accessed by the control unit 14, where the key server the host 14 uses may be external to the host or an internal host 14 component.

The connections 20 and 22 may be characterized as "in-band" with respect to the storage related operations involving the host 14, control unit 12 and storage drive 2, whereas the connections via network 26 among the host 14, control unit 12 and key server 24 may be characterized as "out-of-band" with respect to the storage network or connections 20 and 22 used for storage related operations.

The key server 24 maintains a key store comprising a database or other data structure storing encryption keys that are used to encrypt data from different storage media 4. The key store may comprise a software element such as an array, structure, database, file, etc. In addition, a key store may also comprise a hardware element such as memory, media, a hard drive, storage device, etc.

The key server 24 receives a request for an encryption key, accesses the encryption key from the key store, and sends the encryption key to the control unit 12 or host 14 requesting the key. This encryption key is then sent to the storage drive 2, where the key is loaded into the encryption engine 10 and used to decrypt/encrypt data with respect to a coupled/mounted storage media 4. In one embodiment, the storage drive 2 sends a request for the encryption key with a message including an encrypted version of the encryption key that the storage drive 2 cannot decrypt. The key manager 24 decrypts the encrypted encryption key sent by the storage drive 2 and then sends this decrypted encryption key back to the storage drive 2. In one embodiment, the key manager 24 may encrypt the decrypted encryption key using an encryption key that is available to the storage drive 2, such as a session key, so that the storage drive 2 may decrypt the encrypted encryption key from the key manager 24 to use.

Figure 2:
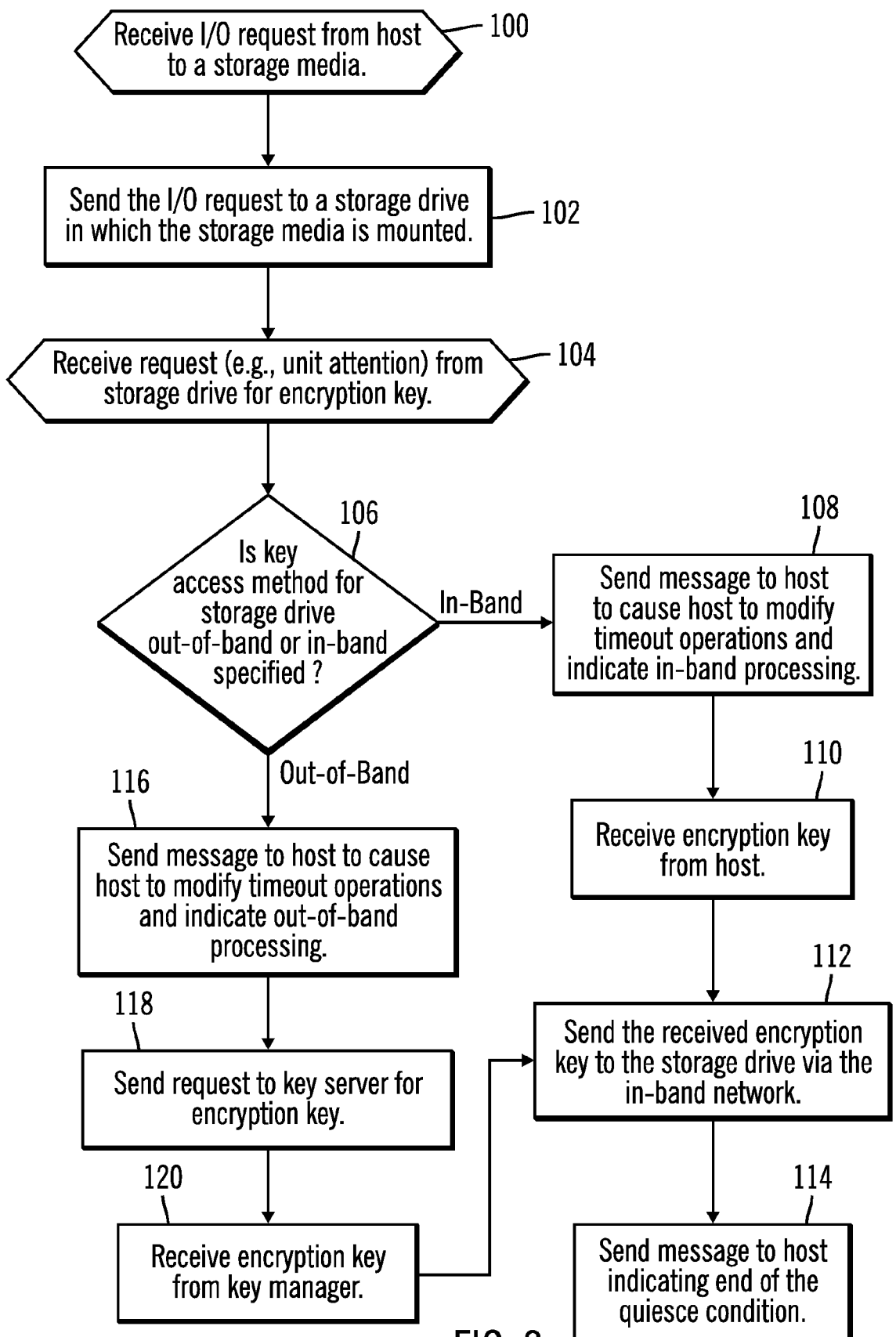
FIG. 2 illustrates an embodiment of operations performed by a control unit.

FIG. 2 illustrates an embodiment of operations performed by the control unit 12 code 16 to process a host 14 I/O request directed to a storage drive 2. Upon receiving (at block 100) an I/O request directed to a storage media 4 or storage drive 2, the control unit 12 sends (at block 102) the I/O request to the storage drive 2 in which the target storage media is mounted. In an embodiment where the connections 20 and 22 use different communication protocols, such as different host driven command-response protocols, the control unit 12 may unpack the I/O request from the host 14 and encode in a packet using the connection protocol for connection 22, which may be different from the connection protocol used for connection 20. Upon receiving (at block 104) a request (e.g., unit attention) from the storage drive 2 for an identified encryption key that the storage drive 2 needs to execute the I/O operation, the control unit 12 determines (at block 106) the key access method for the storage drive 2, i.e., whether the control unit 12 requests over connection 20 that the host 14 obtain the encryption key from the key server 24 (in band), or the control unit 12 obtains the encryption key directly over network 26 (out-of-band). The request from the storage drive 2 for the key may include an encryption key identifier (ID) or an encrypted encryption key that the key server 24 is to decrypt to return to the storage drive 2 to use.

To determine whether the in-band or out-of-band key access method is specified, the host 14 may at some point communicate to the control unit 12 the in-band or out-of-band preference for a particular tape drive 2, such as when the host 14 mounts a storage media 4 in a storage drive 2. In one embodiment, the host 14 may specify different key access methods for different storage drives 2 being accessed, so that for certain storage drives, the control unit 12 may have the host 14 communicate with the key server 24 to obtain the encryption key, i.e., in-band, and for other drives the control unit 12 may obtain the encryption key directly from the key sever 24, i.e., out-of-band. In an alternative embodiment, the host 14 may specify a single key access method that is applied to multiple or all of the storage drives 2 that the host 14 may access. Alternative techniques may be used by the control unit 12 to determine the key access method.

If (at block 106) in-band processing is specified, then the control unit 12 sends (at block 108) a message to the host 14 to cause the host 14 to modify timeout operations and indicate in-band processing to cause the host 14 to communicate with the key server 24 to facilitate key exchange. The control unit 12 may send the message at block 108 upon receiving a request for the encryption key from the storage drive 2. In one embodiment, the message to modify the timeout operations may comprise a quiesce message, error message, or pseudo-error message, such as a long busy or other busy notification, which indicates to the host 14 to suspend any timeout operations that would otherwise cause the host to timeout the submitted I/O request while the storage drive 2 is waiting for the encryption key. Further, the message may include a unit check status indicating whether the host 14 is to obtain the key via in-band processing or that the control unit 12 will obtain the key.

Upon receiving (at block 110) the encryption key from host 14, which may be encrypted using a further encryption key that can be decrypted by the storage drive 2, such as a session key or public key of the storage drive 2, the control unit 12 sends (at block 112) the received encryption key to the storage drive 2 via the in-band network 20. The control unit 12 further sends (at block 114) a message to the host 14 indicating the end of the quiesce condition, which may cause the host 14 to resend the I/O request and restart timeout operations with respect to the I/O job stream. The control unit 12 may send the message at block 112 upon receiving notification from the storage drive 2 successfully received and verified the encryption key.

If (at block 106) out-of-band processing is specified, then the control unit 12 sends (at block 116) a message to the host 14 to cause the host to modify timeout operations and indicate out-of-band processing, or processing that does not involve the host facilitating the exchanges with the key server 24. The control unit 12 sends (at block 118) a request for the encryption key to the key server 24. Other information may be exchanged, for both in-band and out-of-band key exchange, between the storage drive 2 and key server 24 via the control unit 12 to complete the exchange of the encryption key from the key server 24 to the storage drive 2. Upon receiving (at block 120) the encryption key, control proceeds to block 112 to forward the key to the storage drive 2 and notify the host 14 to resend the I/O request and end the error-mode processing, i.e., end the suspension of timeout operations.

For both in-band and out-of-band processing, the key server 24 may request additional information from the storage drive 2, via the control unit 12 (out-of-band) or via the host 14 and control unit 12 (via in-band), such as a certificate to allow the key server 24 to determine whether the storage drive 2 is authorized to access the encryption key and a session key that the key server 24 uses to encrypt the encryption key being sent to the storage drive 2, where the storage drive 2 may decrypt the encrypted encryption key from the key server 24 using the session key.

Once the control unit 12 has indicated to the host 14 that the key exchange is required with the quiesce message, the control unit 12 continues to send the same or different quiesce message, such as a general long busy, to subsequent host commands 14 directed to the storage drive 2. However, host 14 commands not directed to the storage drive 2 may not be failed. For instance, the control unit 12 may not return the quiesce message and may execute commands that are performed within the control unit 12 and do not require interaction with the storage drive 2, commands sent by the host 14 to accomplish an in-band key exchange, and selected drive commands such as rewind and rewind/unload which negate the need for the key exchange to complete. Host 14 commands that negate the storage drive 2 need for the key exchange are sent to the storage drive 2 and result in the control unit 12 exiting the "exchange required" state. Additionally, various host 14 interface resets may cause the control unit 12 to exit the "exchange required" state. If the control unit 12 exits the "exchange required" state due to a reset or selected drive-related commands (e.g., rewind and rewind/unload) before the key exchange has completed, subsequent host 14 commands may result in the drive re-raising the condition and the sequence begins anew.

Figure 3:
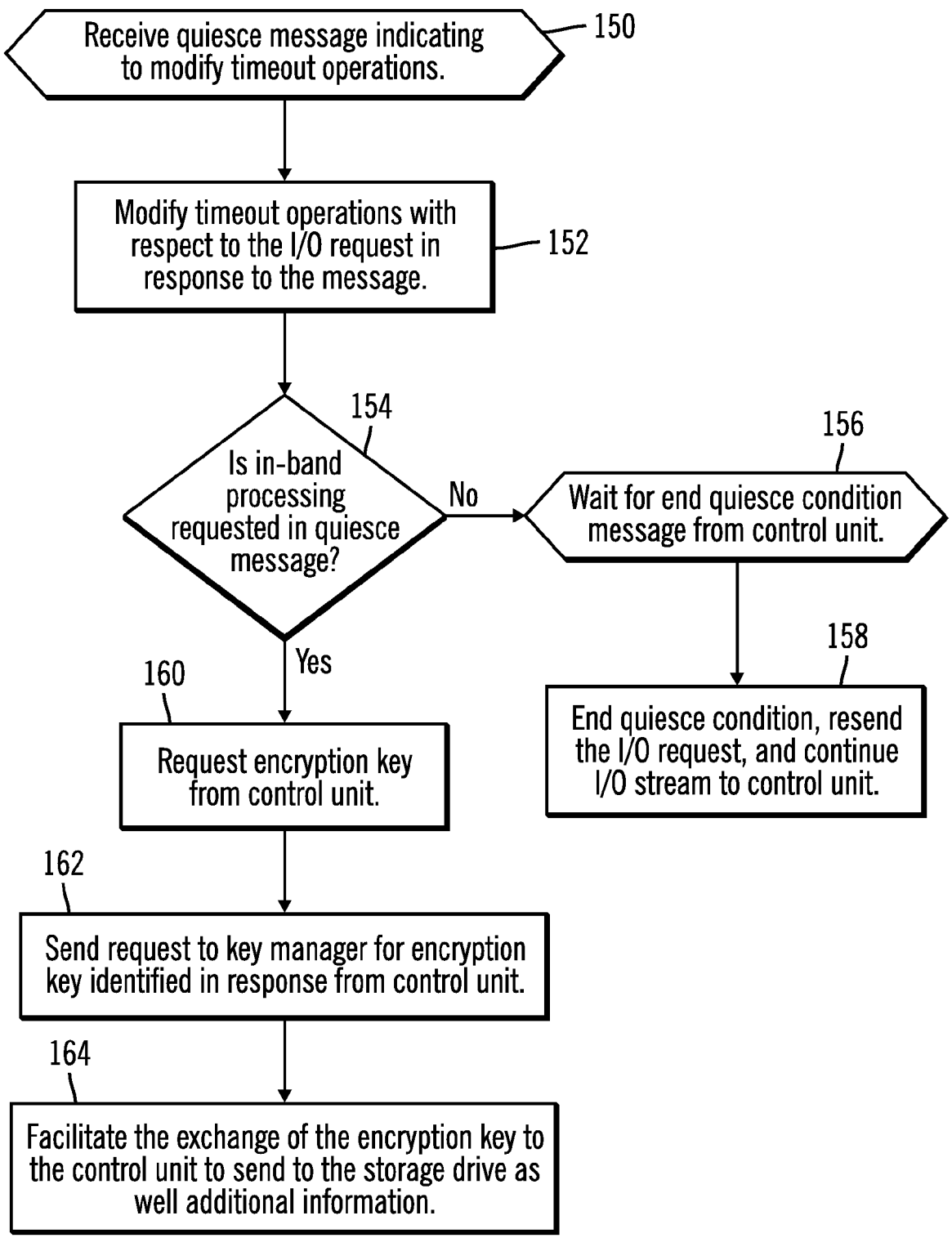
FIG. 3 illustrates an embodiment of operations performed by a host system.

FIG. 3 illustrates an embodiment of operations performed by the host 14 code 18 to handle a quiesce message from the control unit 12 indicating to modify the timeout operations with respect to an I/O request sent to the control unit 12. As discussed, the quiesce message may request the host 14 to suspend timeout operations with respect to the I/O job stream, such as a long busy or other notification. Upon receiving (at block 150) the quiesce message, the host 14 modifies (at block 152) timeout operations with respect to the I/O request, e.g., suspend timeout operations. The quiesce message may further indicate whether the host 14 is to communicate with the key server 24 over network 26 to facilitate key exchange between the key server 24 and the storage drive 2. This indication of in-band processing may be in the form of a unit check code provided with the quiesce message. If (at block 154) in-band processing is not specified, which may mean that the control unit 12 obtains the encryption key via an out-of-band network 24, then the host 14 waits (at block 156) for an end of the quiesce condition notification. Upon receiving such a message indicating the end of the quiesce mode, the host 14 ends (at block 158) the error condition, which may involve ending suspension of timeout operations, resends the last uncompleted I/O request, and continues processing the I/O stream to the control unit 12.

If (at block 154) the quiesce message indicates in-band processing, then the host 14 requests (at block 160) the encryption key to obtain from the control unit 12. In response to the request, the control unit 12 may forward the encryption key requested by the storage drive 2, which may be in the form of an encrypted version of the encryption key the storage drive 2 requests or an identifier of the encryption key. The host 14 sends (at block 162) the request for the encryption key to the key server 24. The host 14 then facilitates (at block 164) the exchange of the encryption key between the key server 24 and the storage drive 2 via the control unit 12. In one embodiment, the host 14 may facilitate the exchange by transferring messages between the key server 24 to the control unit 12 in which the key server 24 requests information needed to process the key request, such as a certificate for the storage drive 2 and session key to use to encrypt the requested encryption key returned to the storage drive 2, etc. The host 14 may further receive a message terminating the exchange once the storage drive 2 has received the encryption key.

With the described embodiments, the control unit 12 may request that a host 14 suspend timeout operations for I/O requests while an encryption key or other information that the storage drive 2 requests is being obtained, via in-band or out-of-band processing, so that the host 14 does not terminate the I/O request as a failed request. The described embodiments provide a technique to cause the host 14 to wait for the storage drive 2 to obtain the encryption key or other information to use to perform the I/O request and then notify the host to resend the I/O request and continue further I/O operations after the storage drive 2 is ready to process the I/O request, such as by obtaining the needed encryption key. Further, once the storage drive 2 has the encryption key or other requested information, subsequent I/O requests from the host 14 to the storage drive 2, sent via the control unit 12, may be immediately processed by the storage drive 2 using the previously received encryption key.

Figure 4:
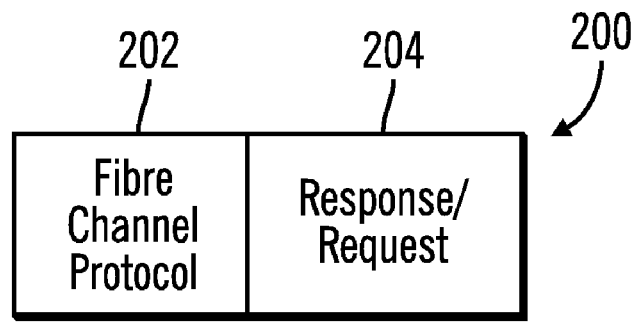
FIGS. 4 and 5 illustrates packet structures known in the prior art.

FIG. 4 illustrates a packet 200 structure known in the art having Fibre Channel Protocol (FCP) header information 202 and a message response/request 204. Packet 200 may be communicated between the storage drive 2 and the control unit 12 via connection 22.

Figure 5:
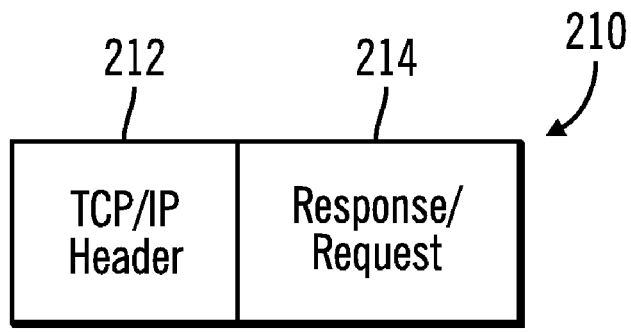

FIG. 5 illustrates a packet 210 structure known in the art having TCP/IP header information 212 and a message response/request 214. Packet 210 may be communicated between the key server 24 and the control unit 12 or host 14 over network 26.

Figure 6:
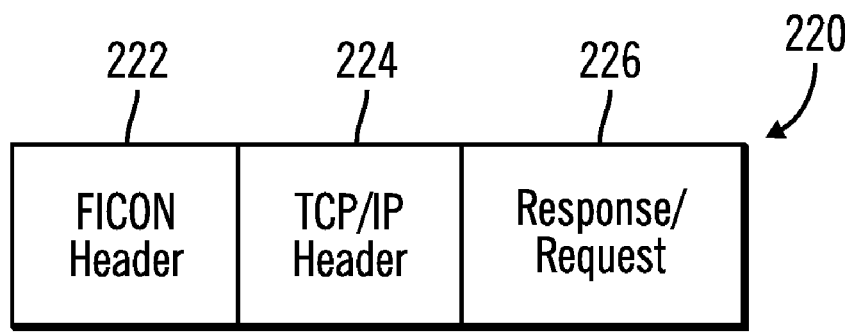
FIG. 6 illustrates a packet structure encoded using multiple communication protocols.

FIG. 6 illustrates a packet 220 structure having FICON header information 222, TCP/IP header information 224 and a message response/request 226. Packet 220 may be communicated between the host 14 and control unit 12 over connection 20. In alternative embodiments where the connection 20 uses the same communication protocol used for connection 22, then the header information 222 may be encoded using the same host driven command-response protocol used for connection 20.

Figure 7:
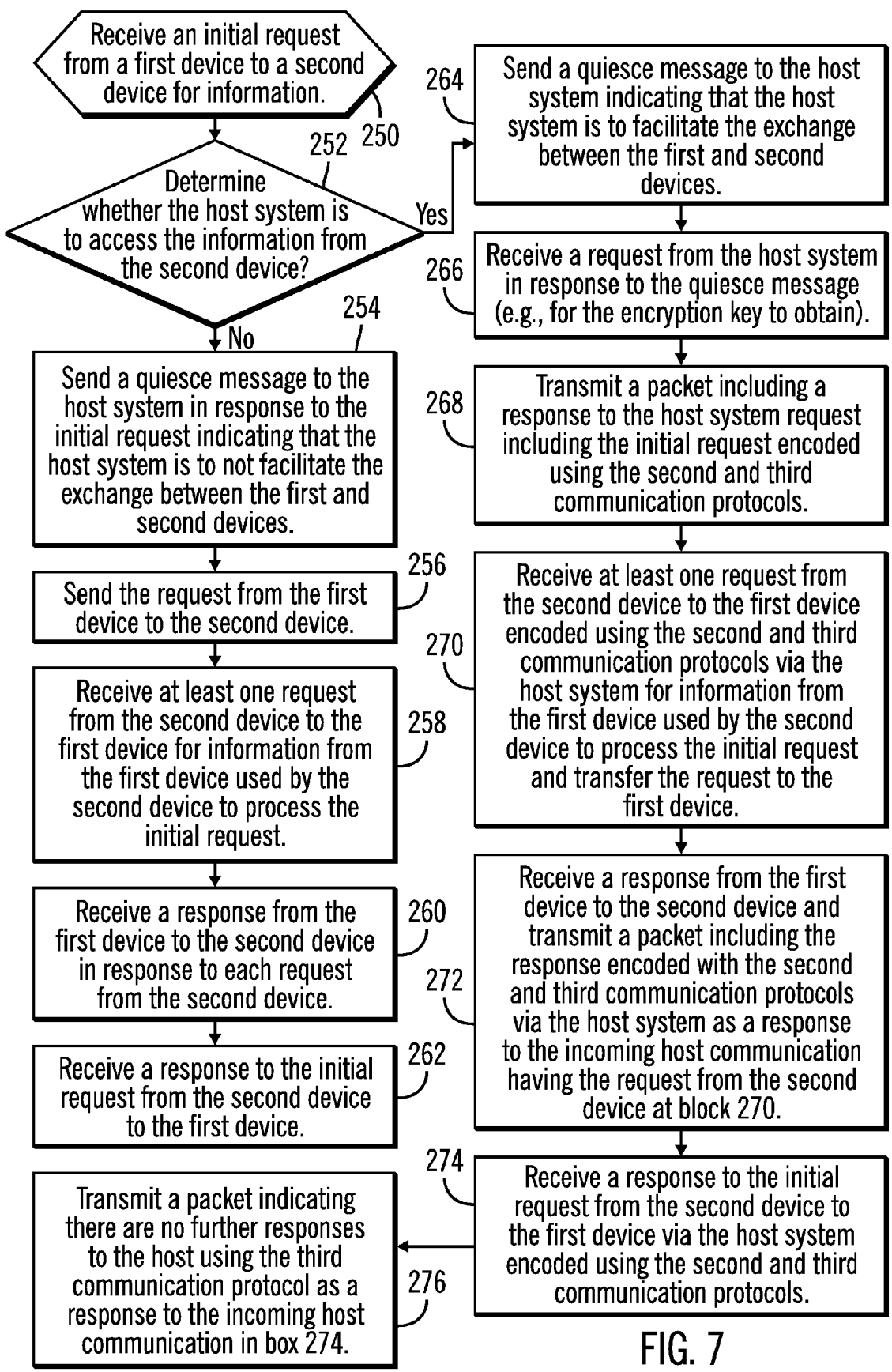
FIG. 7 illustrates an embodiment of operations to process a request from a device.

FIG. 7 illustrates an embodiment of operations performed by a device, such as the control unit 12, to process a request from a first device, such as the storage drive 2, for information from a second device, such as an encryption key from the key server 24, in an environment including a host system 14. Upon receiving (at block 250) an initial request from the first device to the second device for information, the control unit 12 determines (at block 252) whether the host system 14, or other such intermediate device, is to access the information from the second device, i.e., in-band is specified or out-of-band is specified. If (from the no branch of block 252) the host system 14 is not involved in obtaining the requested information, i.e., out-of-band is specified, then the control unit 12 sends (at block 254) a quiesce or error message to the host system 14 indicating that the host system 14 is not to facilitate the exchange between the first and second devices. The control unit 12 sends (at block 256) the request from the first device to the second device over network 26.

To process the request from the first device to the second device, the control unit 12 may also facilitate the transmission of additional response and request commands between the first and second devices. For instance, the control unit may receive (at block 258) at least one request from the second device to the first device for information from the first device used by the second device to process the initial request from the first device, e.g., information needed by the key server 24 to process a request from the storage drive 2 for an encryption key. Further, the control unit 12 may also receive (at block 260) a response from the first device to the second device in response to each request from the second device, e.g., the certificate or session key from the storage drive 2 sent to the key server 24 in response to information requests from the key server 24. The operations at blocks 258 and 260 are performed for each request/response pair. Alternatively, the second device, e.g., control unit, may respond directly to the initial request from the first device so that the operations at blocks 258 and 260 are not performed. The control unit 14 further receives (at block 262) a response to the initial request from the second device to the first device, such as the encryption key requested by the storage drive 2 in response to an I/O request from the host system 14 requiring the use of an encryption key.

If (at block 252) the host system 14 is involved in facilitating the exchange of requests between the first device, e.g., storage drive 2, and second device, e.g., key server 24, (i.e., in-band is specified), then the control unit 12 may send (at block 264) a quiesce message to the host system 14 indicating that the host system 14 is to facilitate the exchanges between the first and second devices. Upon receiving (at block 266) a request from the host system 14 in response to the quiesce message (e.g., for the encryption key to obtain), the control unit 12 transmits (at block 268) a packet, e.g., 220 (FIG. 6), to the host system 14 including a response to the host system request which includes the initial request at operation 250 encoded using the second (e.g., TCP/IP header 224) and third communication (e.g., FICON header 222) protocols. In one embodiment, the request sent to the host system 14 may comprise the request sent at block 250.

To process the request from the first device to the second device via the host system 14, the control unit 12 may also facilitate the transmission of additional response and request commands. For instance, the control unit 12 may receive (at block 270) at least one request from the second device to the first device using the second and third communication protocols from the host system 14 for information from the first device used by the second device to process the initial request and transfer the request to the first device. The control unit 12 may further receive (at block 272) a response from the first device to the second device and transmit a packet including the response encoded with the second and third communication protocols via the host system 14 as a response to the incoming host communication having the request from the second device at block 260. The operations at blocks 258 and 260 are performed for each request/response pair. Alternatively, the second device, e.g., control unit, may respond directly to the initial request from the first device so that the operations at blocks 270 and 272 are not performed. The control unit 12 may further receive (at block 274) a response to the initial request from the second device to the first device via the host system encoded using the second and third communication protocols, such as the encryption key requested by the storage drive 2 in response to the host system 14 I/O request. The control unit 12 may further transmit a packet indicating there are no further responses to the host 14 using the third communication protocol as a response to the incoming host communication in box 274.

Figure 8:
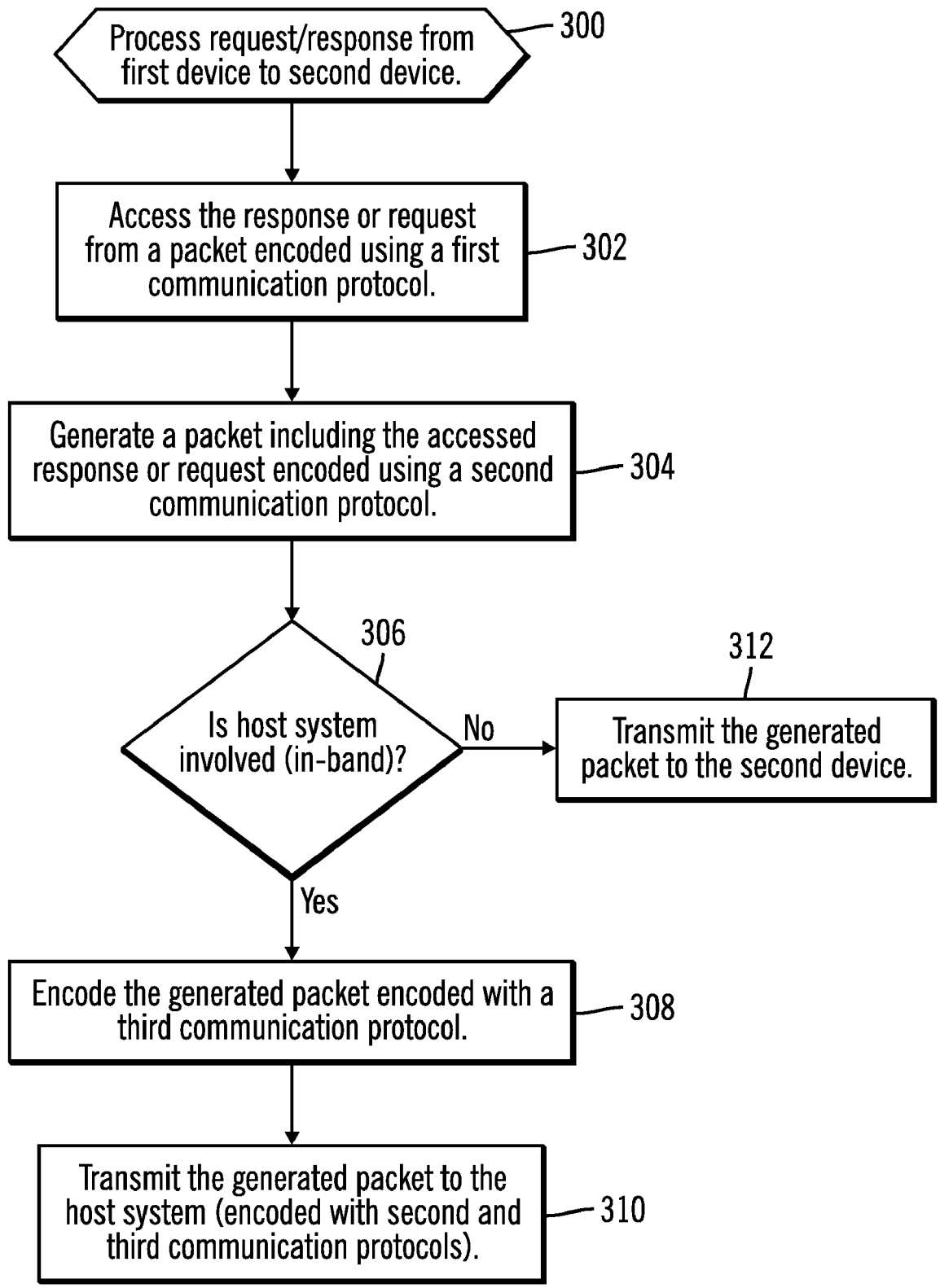
FIG. 8 illustrates an embodiment of operations to exchange responses and requests from a first device to a second device.

FIG. 8 illustrates an embodiment of operations performed by the control unit 12 code 16 to process requests and responses from the first device, e.g., storage drive 2, to direct to the second device, e.g., the key server 24. In one embodiment, the response or request from the first device, such as the storage drive 2, is included in a packet 200 (FIG. 4) encoded using a first communication protocol, such as a host driven command-response protocol (e.g., a Fibre Channel Protocol having header 202), used on connection 22 between the control unit 12 and first device, e.g., storage drive 2. Upon receiving (at block 300) a response or request from the first device to the second device in a packet 200, the control unit 12 accesses (at block 302) the response or request from the packet 200 encoded using a first communication protocol, e.g., a Fibre Channel Protocol 202. Accessing the response/request may involve removing the first communication protocol (e.g., Fibre Channel Protocol) header 202 from the packet. The control unit 12 generates (at block 304) a packet 210 (FIG. 5) including the accessed response or request 214 encoded using a second communication protocol, e.g., TCP/IP, and having protocol header 212. If (at block 306) the host system 14 is involved in facilitating the packet exchange, i.e., in-band communication, then the control unit 12 further encodes (at block 308) the generated packet with a third communication protocol (e.g., FICON) to form a packet 220 having headers 224 and 222 for the second (TCP/IP) and third (FICON) communication protocols, respectively. This packet 220 is transmitted (at block 310) to the host system 14. If (at block 306) the host system 14 is not involved in facilitating packet exchange between the first and second devices, i.e., out-of-band is specified, then the control unit 12 transmits the generated packet 210 to the second device over network 26.

Figure 9:
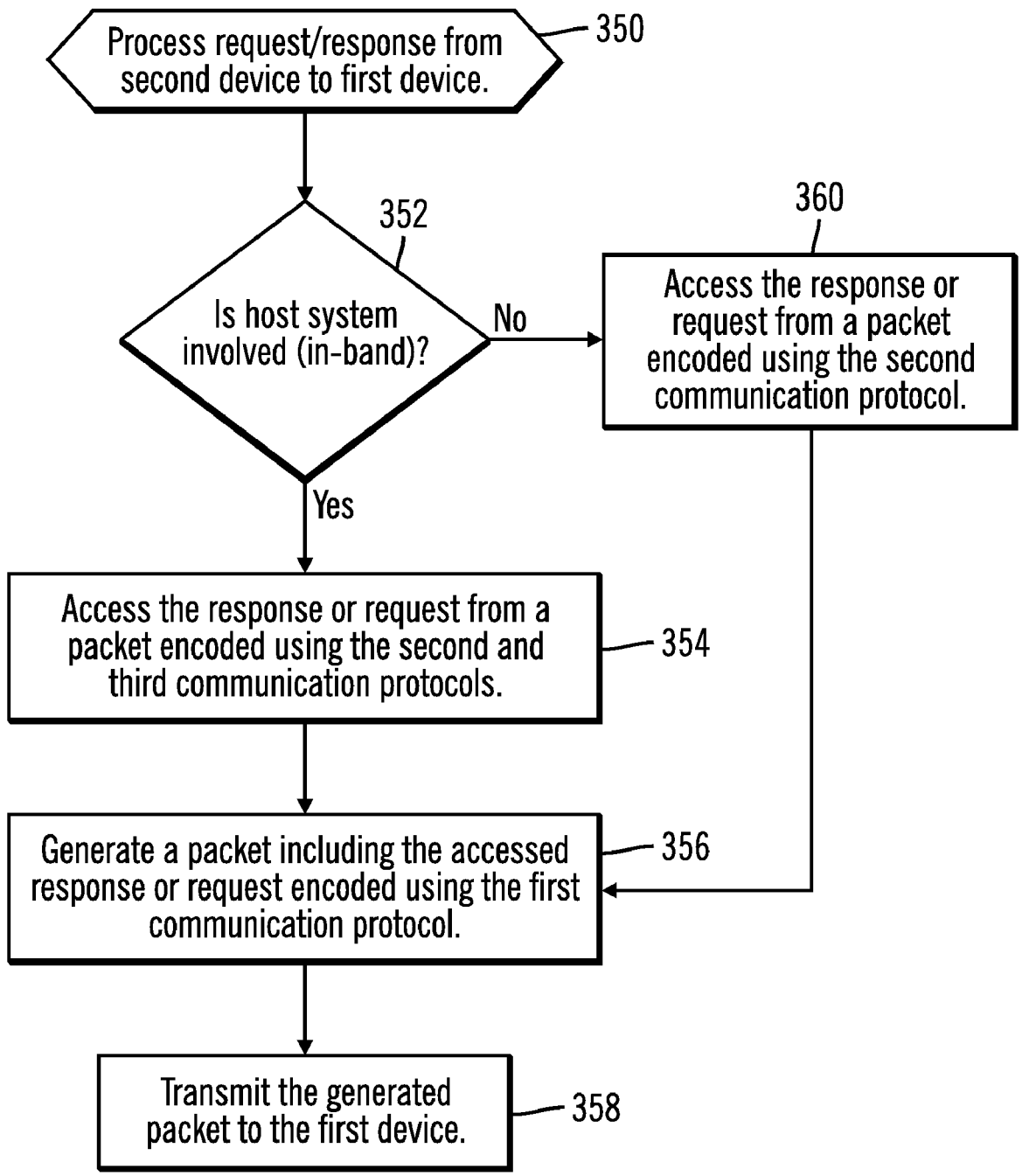
FIG. 9 illustrates an embodiment of operations to exchange responses and requests from a second device to a first device.

FIG. 9 illustrates an embodiment of operations performed by the control unit 12 code 16 to process requests and responses from the second device, e.g., the key server 24, to the first device, e.g., storage drive 2. In one embodiment, the response or request from the second device, such as the key server 24, is included in a packet 210 (FIG. 5 encoded using a second communication protocol, such as network protocol other than a host driven command-response protocol (e.g., having TCP/IP header 212), used for network 26. Upon receiving (at block 350) a request from the second device to the first device, which may arrive via network 26 or connection 20, the control unit 12 determines (at block 352) whether the host system 14 is involved, i.e., in-band via connection 20. If so, then the control unit 12 accesses (at block 354) the response or request 226 (FIG. 6) from a packet 220 encoded using the second (e.g., TCP/IP) and third (e.g., FICON) communication protocols, which may involve removing the headers 222 and 224. The control unit 12 generates (at block 356) a packet 200 (FIG. 4) including the accessed response or request 204 encoded using the first communication protocol (e.g., Fibre Channel) having header 202. This generated packet 200 is sent (at block 358) to the first device, e.g., storage drive 2.

If (at block 352) the host system 14 is not involved, i.e., out-of-band processing where the second device sends packets to the control unit 12 via network 26, bypassing the host system 14, then the control unit 12 accesses (at block 360) the response or request 214 (FIG. 5) from a packet 210 encoded using the second communication protocol (e.g., TCP/IP) and proceeds to block 356 to generate the packet 200 to send to the first device. As discussed, accessing the response/request from a packet may involve stripping the headers from the packet for communication protocols that will not be used in subsequent transmissions of the packet.

Figure 10:
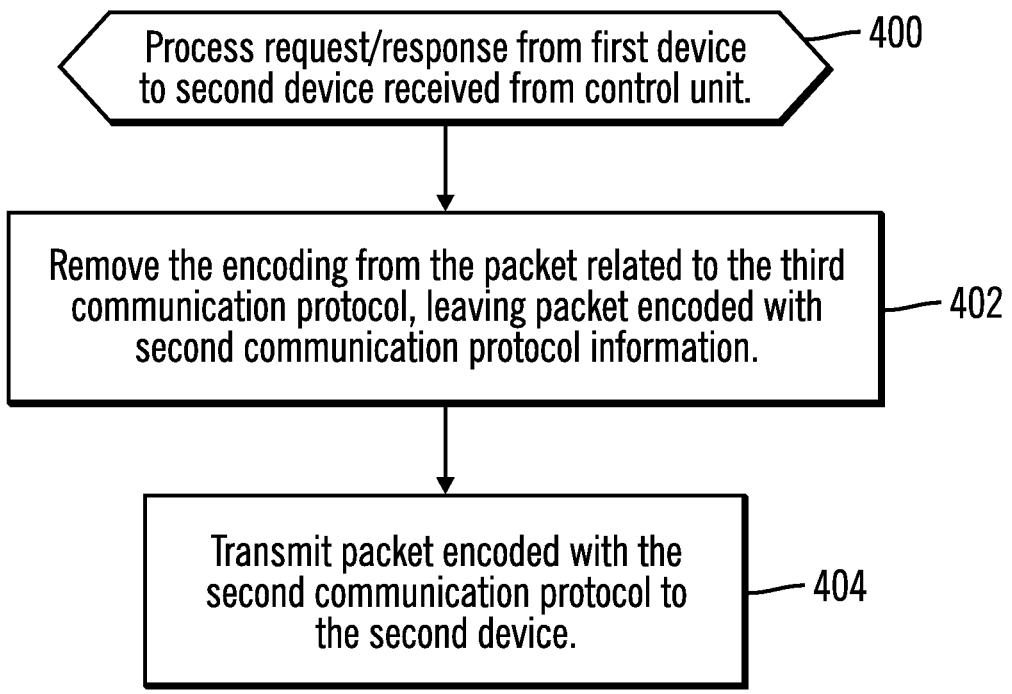
FIG. 10 illustrates an embodiment of operations to exchange responses and requests from a first device to a second device.

FIG. 10 illustrates an embodiment of operations performed by the host code 18 to facilitate the exchange of packets from the first device, e.g., storage drive 2, to the second device, e.g., key server 24, for in-band processing. Upon processing (at block 400) a request/response from the first device to the second device received from the control unit 12, the host system 14 removes (at block 402) the encoding from the packet related to the third (e.g., FICON) communication protocol, such as by removing the header 222 (FIG. 6), leaving packet, such as packet 210 (FIG. 5) encoded with second (e.g., TCP/IP) communication protocol information, e.g., TCP/IP header 212. The host system 14 then transmits the packet 210 to the second device over network 26.

Figure 11:
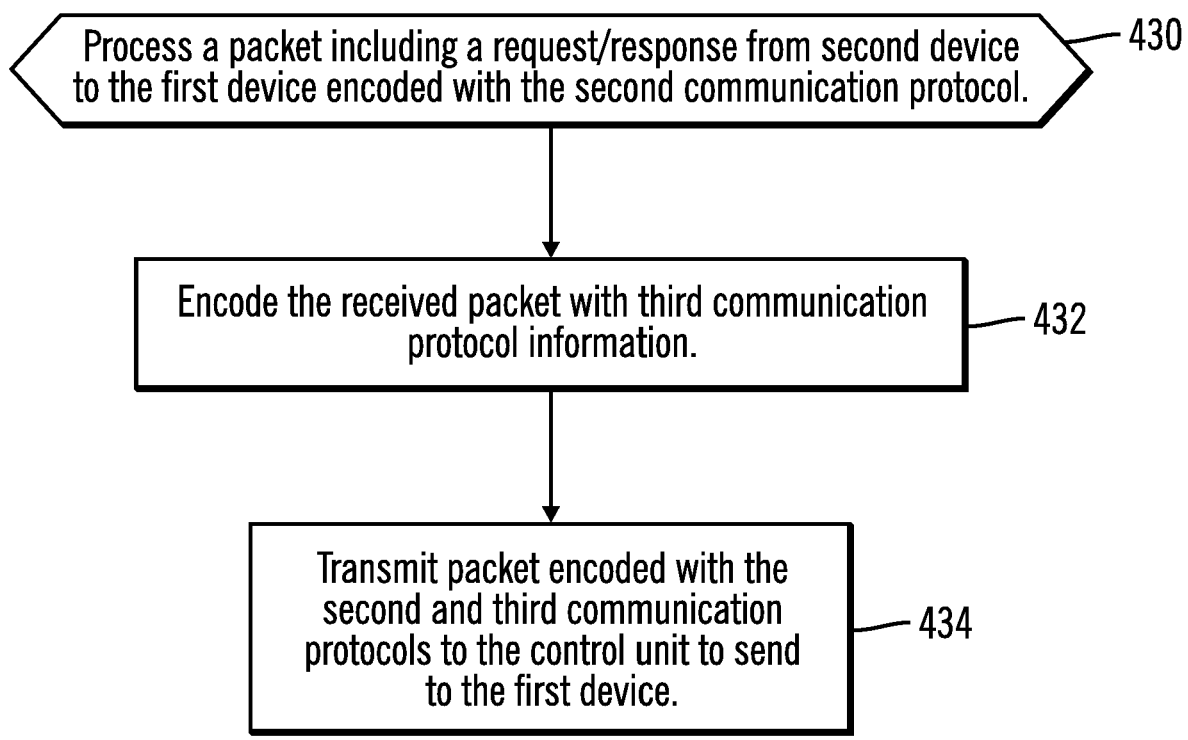
FIG. 11 illustrates an embodiment of operations to exchange responses and requests from a second device to a first device.

FIG. 11 illustrates an embodiment of operations performed by the host code 18 to facilitate the exchange of packets from the second device, e.g., key server 24, to the first device, e.g., storage drive 2, for in-band processing. Upon processing (at block 430) a packet 210 (FIG. 5) including a request/response 214 from the second device to the first device encoded with the second (e.g., TCP/IP) communication protocol, having TCP/IP header 212, the host system 14 encodes (at block 432) the received packet 210 with third (e.g., FICON) communication protocol information to generate packet 220 having headers 222 and 224. The host system 14 transmits (at block 434) the packet 220 encoded with the second (e.g., TCP/IP) and third (e.g., FICON) communication protocols to the control unit 12 to send to the first device.

The operations of FIGS. 8 and 9 performed by the control unit 12 to process requests between two devices may be used with the operations of FIG. 2 to transmit responses and requests between the storage drive 2 and the key server 24 via the host system 14 or the network 26. The operations of FIGS. 10 and 11 performed by the host 14 may be used with the operations of FIG. 3 to facilitate the exchange of responses and requests between the storage drive 2 and the key server 24.

Described embodiments provide techniques for facilitating the exchange of responses and requests between two devices through intermediary devices, such as a control unit and host, where different communication protocols are used by the two devices and by the intermediary devices.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the storage drive 2 was described as requesting an encryption key to perform an I/O request from a host system 14. In alternative embodiments, the exchange of information may be between a storage drive 2 and another device to obtain information other than an encryption key, such as information needed by the storage drive 2 for continued I/O processing or other related operations, including information needed to continue processing a host I/O request. In certain embodiments, the host suspends timeout operations while the storage drive obtains information from an external device needed to continue I/O processing. Further, the host may specify an information access method for the information exchange, either in-band or out-of-band, to provide the storage drive information other than an encryption key In described embodiments the exchange was between a storage drive 2 and key server 24 or other device. In alternative embodiments, the host and control unit or other network components may use the described embodiments to exchange responses, requests and other information between devices other than a storage drive and key server. For instance, the control unit and host may facilitate the exchange between other types of I/O devices, such as printers, switches, transmitters, etc.

In described embodiments, the first device, e.g., the storage drive 2, initiated a request for information, e.g., an encryption key, in response to a host I/O request. In an alternative embodiment, the first device may initiate the request for information from the second device in response to an event other than a host I/O request.

In the described embodiments of FIGS. 7-11 different host driven command-response protocols were used for communications between the first device, e.g., storage drive 2, and the control unit 12 and between the host 14 and the control unit 12. In an alternative embodiment, the same host driven command-response protocol, e.g., Fibre Channel, FICON, etc., may be used for communications between the first device, e.g., storage drive 2, and the control unit 12 and between the host 14 and the control unit 14. In such case, the packets sent between the control unit 12 and the host 14 would include the same command response protocol header included in the packets between the storage drive 2 and control unit 12, i.e., the same communication protocol is used on connections 20 and 22.

FIGS. 4, 5, and 6 show certain information included in packets. Additional and different information may be included with the packets.

In the described embodiments, the intermediate devices facilitating the exchange of data between the first and second devices comprised a storage control unit and a host. In alternative embodiments, other types of intermediate devices may be used to facilitate the exchange of packets between first and second devices using different communication protocols.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Figure 12:
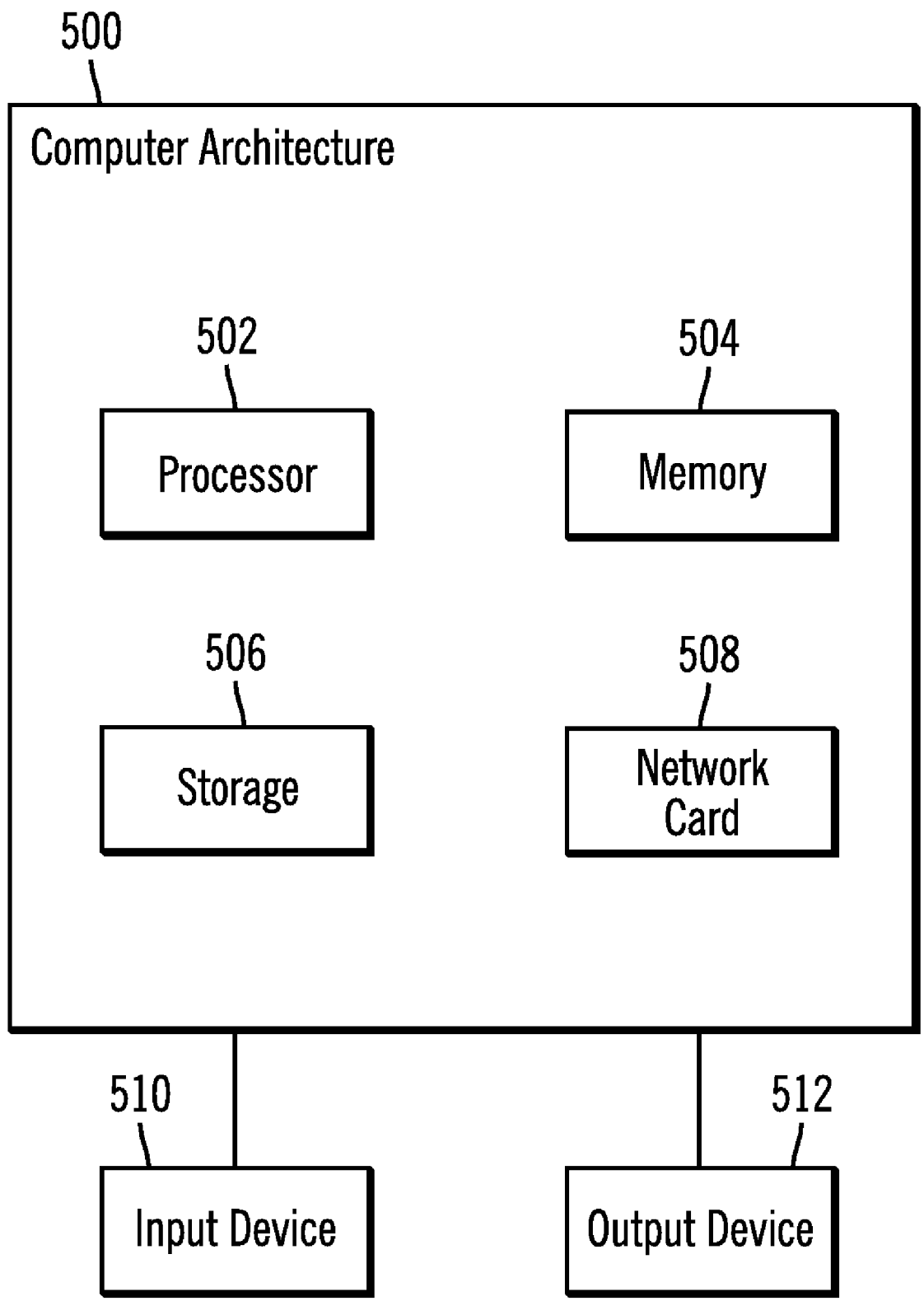
FIG. 12 illustrates an embodiment of a computer architecture.

FIG. 12 illustrates one embodiment of a computer architecture 500 known in the art of the network components, such as the control unit 12, host 14, key server 24 and storage drive 2 shown in FIG. 1. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network, such as an Ethernet, a Fibre Channel Arbitrated Loop, etc. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The illustrated operations of FIGS. 2, 3, 7, 8, 9, 10, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture having code enabled to process communications between a host and storage drive having a storage media and to cause operations to be performed, the operations comprising:
   receiving an Input/Output (I/O) request from the host directed to the storage media that requires requested information be sent to the storage drive to use to execute the I/O request against the storage media; and
   sending a message to the host to cause the host to modify I/O timeout operations in response to determining that the requested information is required.

2. The article of manufacture of claim 1, wherein the message comprises a first message, wherein the operations further comprise:
   sending a second message to the host to cause the host to resend the I/O request in response to the storage drive receiving the requested information.

3. The article of manufacture of claim 2, wherein the first message comprises a quiesce message that causes the host to suspend an I/O request job stream and suspend any timeout operation with respect to the I/O request, and wherein the second message causes the host to restart timeout operations and resend the I/O request.

4. The article of manufacture of claim 1, wherein determining that the information is needed comprises receiving a request for the information from the storage drive.

5. The article of manufacture of claim 1, wherein the message indicates an information access method indicating that the requested information is transferred between the storage drive and a device via the host facilitating the exchange of the requested information over a first network over which the I/O request was communicated or via a second network.

6. The article of manufacture of claim 5, wherein the operations further comprise:
   receiving from the host indication of the information access method for a plurality of storage drives, wherein the first network and the second network are capable of being indicated as the information access method for different storage drives.

7. The article of manufacture of claim 5, wherein the message indicates that the information access method uses the second network, wherein the operations further comprise:
   sending a request for the requested information to the device over the second network;
   receiving an information key from the device; and
   sending the received information to the storage drive via a third connection.

8. The article of manufacture of claim 5, wherein the message indicates that the information access method uses the first network and wherein the message causes the host to facilitate the exchange of the requested information between the device and the storage drive via the first network.

9. The article of manufacture of claim 1, wherein the operations further comprise:
   returning a quiesce message in response to receiving a subsequent I/O request from the host to the storage drive; and
   permitting processing of host commands that do not require interaction with the storage drive and that terminate the transfer of the requested information to the storage drive.

10. The article of manufacture of claim 1, wherein the requested information comprises an encryption key the storage drive needs to process the host I/O request.

11. An article of manufacture having code enabled to process communications between a control unit and storage drive having a storage media and for causing operations, the operations comprising:
   sending an I/O request to a control unit that is directed to a storage media accessed by a storage drive, wherein the control unit is in communication with the storage drive;
   receiving a message from the control unit in response to the storage drive requesting information to process the I/O request;
   modifying timeout operations with respect to the I/O request in response to the message; and
   resending the I/O request in response to the storage drive receiving the requested information.

12. The article of manufacture of claim 11, wherein the message indicates whether the requested information will be obtained from a device via a first network through which the I/O request was communicated to the control unit or a second network.

13. The article of manufacture of claim 12, wherein the message indicates that the requested information is obtained via the first network, and wherein modifying timeout operations comprises suspending an I/O request job stream including the sent I/O request, and wherein the operations further comprise:
   sending a request to the device for the requested information;
   sending the requested information from the device to the control unit to forward to the storage drive in response to obtaining the requested information; and
   resending the I/O request in response to the storage drive receiving the requested information.

14. The article of manufacture of claim 13, wherein the message comprises a first message, further comprising:
   receiving a second message from the control unit in response to the storage drive receiving the requested information, wherein the I/O request is resent and the I/O job stream suspension ended in response to receiving the second message.

15. The article of manufacture of claim 12, wherein the message indicates that the requested information is obtained via the second network, wherein the message comprises a first message, wherein the operations further comprise:
   receiving a second message from the control unit in response to the storage drive receiving the requested information, wherein the I/O request is resent in response to receiving the second message.

16. The article of manufacture of claim 11, wherein the requested information comprises an encryption key the storage drive needs to process the I/O request.

17. A system in communication with a host and a storage drive having a storage media, comprising:
   a processor; and
   code executed by the processor to perform operations, the operations comprising:
   receiving an Input/Output (I/O) request from the host directed to the storage media that requires requested information be sent to the storage drive to use to execute the I/O request against the storage media; and
   sending a message to the host to cause the host to modify I/O timeout operations in response to determining that the requested information is required.

18. The system of claim 17, wherein the message comprises a first message wherein the operations further comprise:
   sending a second message to the host to cause the host to resend the I/O request in response to the storage drive receiving the requested information.

19. The system of claim 18, wherein the first message comprises a quiesce message that causes the host to suspend an I/O request job stream and suspend any timeout operation with respect to the I/O request, and wherein the second message causes the host to restart timeout operations and resend the I/O request.

20. The system of claim 17, wherein the message indicates an information access method indicating that the requested information is transferred between the storage drive and a device via the host facilitating the exchange of the requested information over a first network over which the I/O request was communicated or via a second network.

21. The system of claim 20, wherein the operations further comprise:
   receiving from the host indication of the information access method for a plurality of storage drives, wherein the first network and the second network are capable of being indicated as the information access method for different storage drives.

22. The system of claim 20, wherein the message indicates that the information access method uses the second network, wherein the operations further comprise:
   sending a request for the requested information to the device over the second network;
   receiving an information key from the device; and
   sending the received information to the storage drive via a third connection.

23. The system of claim 17, wherein the operations further comprise:
   returning a quiesce message in response to receiving a subsequent I/O request from the host to the storage drive; and
   permitting processing of host commands that do not require interaction with the storage drive and that terminate the transfer of the requested information to the storage drive.

24. The system of claim 17, wherein the requested information comprises an encryption key the storage drive needs to process the host I/O request.

25. A system in communication with a control unit and a storage drive having a storage media, comprising:
   a processor; and
   code executed by the processor to perform operations, the operations comprising:
   sending an I/O request to the control unit that is directed to the storage media accessed by the storage drive, wherein the control unit is in communication with the storage drive;
   receiving a message from the control unit in response to the storage drive requesting information to process the I/O request;
   modifying timeout operations with respect to the I/O request in response to the message; and
   resending the I/O request in response to the storage drive receiving the requested information.

26. The system of claim 25, wherein the message indicates whether the requested information will be obtained from a device via a first network through which the I/O request was communicated to the control unit or a second network.

27. The system of claim 26, wherein the message indicates that the requested information is obtained via the first network, and wherein modifying timeout operations comprises suspending an I/O request job stream including the sent I/O request, and wherein the operations further comprise:

sending a request to the device for the requested information;

sending the requested information from the device to the control unit to forward to the storage drive in response to obtaining the requested information; and resending the I/O request in response to the storage drive receiving the requested information.

28. The system of claim 25, wherein the requested information comprises an encryption key the storage drive needs to process the I/O request.

29. A method, comprising:

receiving an Input/Output (I/O) request from a host directed to a storage media that requires requested information be sent to a storage drive to use to execute the I/O request against the storage media; and sending a message to the host to cause the host to modify I/O timeout operations in response to determining that the requested information is required.

30. The method of claim 29, wherein the message comprises a first message, further comprising:

sending a second message to the host to cause the host to resend the I/O request in response to the storage drive receiving the requested information.

31. The method of claim 30, wherein the first message comprises a quiesce message that causes the host to suspend an I/O request job stream and suspend any timeout operation with respect to the I/O request, and wherein the second message causes the host to restart timeout operations and resend the I/O request.

32. The method of claim 29, wherein the message indicates an information access method indicating that the requested information is transferred between the storage drive and a device via the host facilitating the exchange of the requested information over a first network over which the I/O request was communicated or via a second network.

33. The method of claim 32, further comprising:

receiving from the host indication of the information access method for a plurality of storage drives, wherein the first network and the second network are capable of being indicated as the information access method for different storage drives.

34. The method of claim 32, wherein the message indicates that the information access method uses the second network, further comprising:

sending a request for the requested information to the device over the second network;

receiving an information key from the device; and sending the received information to the storage drive via a third connection.

35. The method of claim 29, further comprising:

returning a quiesce message in response to receiving a subsequent I/O request from the host to the storage drive; and permitting processing of host commands that do not require interaction with the storage drive and that terminate the transfer of the requested information to the storage drive.

36. The method of claim 29, wherein the requested information comprises an encryption key the storage drive needs to process the host I/O request.

37. A method, comprising:

sending an I/O request to a control unit that is directed to a storage media accessed by a storage drive, wherein the control unit is in communication with the storage drive;

receiving a message from the control unit in response to the storage drive requesting information to process the I/O request;

modifying timeout operations with respect to the I/O request in response to the message; and resending the I/O request in response to the storage drive receiving the requested information.

38. The method of claim 37, wherein the message indicates whether the requested information will be obtained from a device via a first network through which the I/O request was communicated to the control unit or a second network.

39. The method of claim 38, wherein the message indicates that the requested information is obtained via the first network, and wherein modifying timeout operations comprises suspending an I/O request job stream including the sent I/O request, further comprising:

sending a request to the device for the requested information;

sending the requested information from the device to the control unit to forward to the storage drive in response to obtaining the requested information; and resending the I/O request in response to the storage drive receiving the requested information.

40. The method of claim 37, wherein the requested information comprises an encryption key the storage drive needs to process the I/O request.

* * * * *